(12) United States Patent
Jungling et al.

(10) Patent No.: US 11,001,130 B2
(45) Date of Patent: May 11, 2021

(54) OPEN ROOF CONSTRUCTION FOR A VEHICLE AND METHOD OF ATTACHING A PANEL

(71) Applicants: Rainer Gerhard Jungling, Dusseldorf (DE); Marcel Johan Christiaan Nellen, Merselo (NL)

(72) Inventors: Rainer Gerhard Jungling, Dusseldorf (DE); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 128 days.

(21) Appl. No.: 16/531,468

(22) Filed: Aug. 5, 2019

(65) Prior Publication Data

US 2020/0047596 A1 Feb. 13, 2020

(30) Foreign Application Priority Data

Aug. 9, 2018 (EP) .................................... 18188278

(51) Int. Cl.
  *B60J 7/02* (2006.01)
  *B60J 7/00* (2006.01)
(52) U.S. Cl.
  CPC ............. *B60J 7/022* (2013.01); *B60J 7/0023* (2013.01)
(58) Field of Classification Search
  CPC . B60J 7/022; B60J 7/0023; B60J 7/042; B60J 7/043; B62D 25/06; F16B 19/02; B25B 23/005
  (Continued)

(56) References Cited

U.S. PATENT DOCUMENTS 3,066,975 A 12/1962 Larche
4,475,767 A 10/1984 Grimm
(Continued)

FOREIGN PATENT DOCUMENTS

DE 3510759 A1 9/1986
DE 20023526 U1 8/2004
(Continued)

OTHER PUBLICATIONS

Mori Yoshifumi, "Siding Roof Device", Dec. 24, 2010, JP2010285124A (Year: 2010).*
(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

An open roof construction for a vehicle having a roof opening in its fixed roof includes a panel for opening and closing the roof opening. An operating mechanism on each side of the passage opening supports and moves the panel. A bracket on the panel and a support on the operating mechanism each have a plurality of holes and a screw for each pair of holes to attach the bracket to the panel support. At least one pair of holes is provided with a funnel which guides a screwdriver to the respective screw. At least one pair of holes is before or behind the passage opening when the panel is closed. The frame has a mounting opening for the screwdriver is in the same transverse plane as said at least one pair of holes to fasten the screw of said at least one pair of holes.

20 Claims, 11 Drawing Sheets

(58) Field of Classification Search
USPC .......................... 296/216.08, 131, 132, 152
See application file for complete search history.

(56) References Cited

U.S. PATENT DOCUMENTS

| | | | |
|---|---|---|---|
| 4,601,091 A | 7/1986 | Grimm | |
| 4,650,243 A | 3/1987 | Hanley | |
| 4,719,828 A * | 1/1988 | Corsetti | B25B 23/101 |
| | | | 81/451 |
| 4,946,225 A | 8/1990 | Jardin | |
| 5,026,113 A | 6/1991 | DiCarlo | |
| 8,840,174 B2 | 9/2014 | Nellen | |
| 2004/0003682 A1 * | 1/2004 | Nanaumi | B25B 23/005 |
| | | | 81/13 |
| 2011/0233971 A1 | 9/2011 | Nellen | |
| 2015/0343887 A1 * | 12/2015 | Bojanowski | B60J 7/043 |
| | | | 296/213 |
| 2016/0303956 A1 * | 10/2016 | Nellen | B60J 7/0435 |

FOREIGN PATENT DOCUMENTS

| | | |
|---|---|---|
| DE | 102014104834 A1 | 10/2015 |
| DE | 102015121045 A1 | 6/2017 |
| EP | 2368735 A1 | 9/2011 |
| FR | 2516870 A1 | 5/1983 |
| FR | 2555948 A1 | 6/1985 |
| GB | 2165193 A | 4/1986 |
| JP | 2010285124 A * | 12/2010 |
| JP | 58-68424 | 2/2016 |

OTHER PUBLICATIONS

European Search Report for European patent application No. 18188278, dated Feb. 21, 2019.

* cited by examiner

OPEN ROOF CONSTRUCTION FOR A VEHICLE AND METHOD OF ATTACHING A PANEL

BACKGROUND

The discussion below is merely provided for general background information and is not intended to be used as an aid in determining the scope of the claimed subject matter.

The invention firstly relates to an open roof construction for a vehicle having a roof opening in its fixed roof. The open roof construction includes a frame having a passage opening for placement below the roof opening in the fixed roof, the passage opening being smaller than the roof opening. An operating mechanism on each side of the passage opening supports and moves a panel to open and close the roof opening. The panel has a panel bracket below each longitudinal side and the operating mechanisms each include a panel support. The panel bracket and the panel support each are elongated and extend a substantial part of the longitudinal length of the panel and each have a plurality of holes and a screw for each pair of holes to attach the panel bracket to the panel support.

These types of open roof constructions are still manufactured partly by human manipulations. The screws for attaching the panel to the operating mechanism are tightened by a screwdriver handled by an operator.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In an embodiment, at least one pair of holes is provided with a funnel which is in line with this pair of holes at least when the panel is in its closed position in order to guide a screwdriver to the respective screw which is pre-mounted in or in front of the pair of holes.

In this way, it is much easier to bring a bit of the screwdriver in engagement with the screw head, in particular if the operator has no or a bad view on the screw head.

For example, if at least one pair of holes is in a position before or behind the passage opening when the panel is in its closed position within the roof opening, and wherein the frame is provided with a mounting opening in a longitudinal position which is transversely in line with said at least one pair of holes and which is dimensioned to allow passage of a screwdriver to fasten the screw of said at least one pair of holes.

Such mounting opening allows attachment of the panel to the operating mechanism in the closed position of the panel which has the advantage that attachment and height adjustment of the panel can be done in one operation. However, such mounting opening may not provide a proper view of the screw head, so that the funnel facilitates engagement with the screw head. However, such mounting opening may also be useful without the use of a funnel.

In one embodiment, the at least one funnel is attached, for example clipped, to a guide rail for the operating mechanism, which extends at least along the passage opening in the frame in longitudinal direction of the vehicle.

If the funnel is used for a screw near the front of the panel it may be provided in a wind deflector which is in a lower rest position when the panel is in the closed position.

If the funnel is used for the screw near the rear of the panel it may be provided on or be part of a rear beam of the frame.

The funnel has an entrance opening where the screwdriver is inserted and an exit opening opposite the pair of holes, and it is favorable if the entrance opening cross-section is at least twice that of the exit opening to still guide the screwdriver bit to the screw head even if there is a big misalignment.

The funnel may be configured to accommodate and hold a head of the screw in position in front of the pair of holes, or the funnel may even be configured to accommodate and hold the head of the screw and a washer associated with the screw.

In this way it is not necessary to pre-mount the screw in the pair of holes, for example if the panel is in the open position and then move the panel to the closed position to perform the final mounting operation. The funnel will be attached to the open roof construction with the screw and washer already in place.

The exit opening will generally have a circular cross-section, but the entrance opening may have a cross section different from a circle, such as rectangular or oval.

Such different cross section may be chosen if circumstances require it, for example due to dimensional constraints, because a small vertical package of the open roof construction is very important.

The funnel may even be open at the top, but may then be delimited in the closed position of the panel by another part of the open roof construction, such as the panel or a part attached to it, and wherein preferably the inner cross section of the open top funnel is more than 60% of a complete cross section.

This will still allow for a reliable guidance of the screwdriver bit to the screw head.

An aspect of the invention also includes a method of attaching a panel to an operating mechanism of an open roof construction, comprising the steps of: providing a frame having a passage opening therein, providing an operating mechanism at each longitudinal side of the passage opening, said operating mechanism including a movable panel support, providing a panel having on each longitudinal side a panel bracket for attachment to the corresponding panel support by means of a screw fitting in a corresponding holes in the panel bracket and panel support, respectively, the longitudinal dimension of the panel being larger than that of the passage opening, and at least one of the holes being positioned before or behind the passage opening when the panel is in its closed position, providing the frame with a mounting opening in a position in the same transverse plane as the corresponding holes in the panel bracket and support when the panel is in its closed position, and bringing a screwdriver through said opening in line with the screw which is pre-mounted in or in front of the holes and fastening the screw.

Preferably, the screwdriver is brought in line with the screw by means of a funnel mounted in line with the corresponding holes so as to guide the screwdriver to the screw.

The screw may be pre-mounted in the holes, but it is also possible to pre-mount the screw and optionally a washer in the funnel.

BRIEF DESCRIPTION OF THE DRAWING

Further details and advantages of the invention will follow from the below description with reference to the drawings showing embodiments of the invention.

DETAILED DESCRIPTION OF ILLUSTRATIVE EMBODIMENTS

Figure 1:
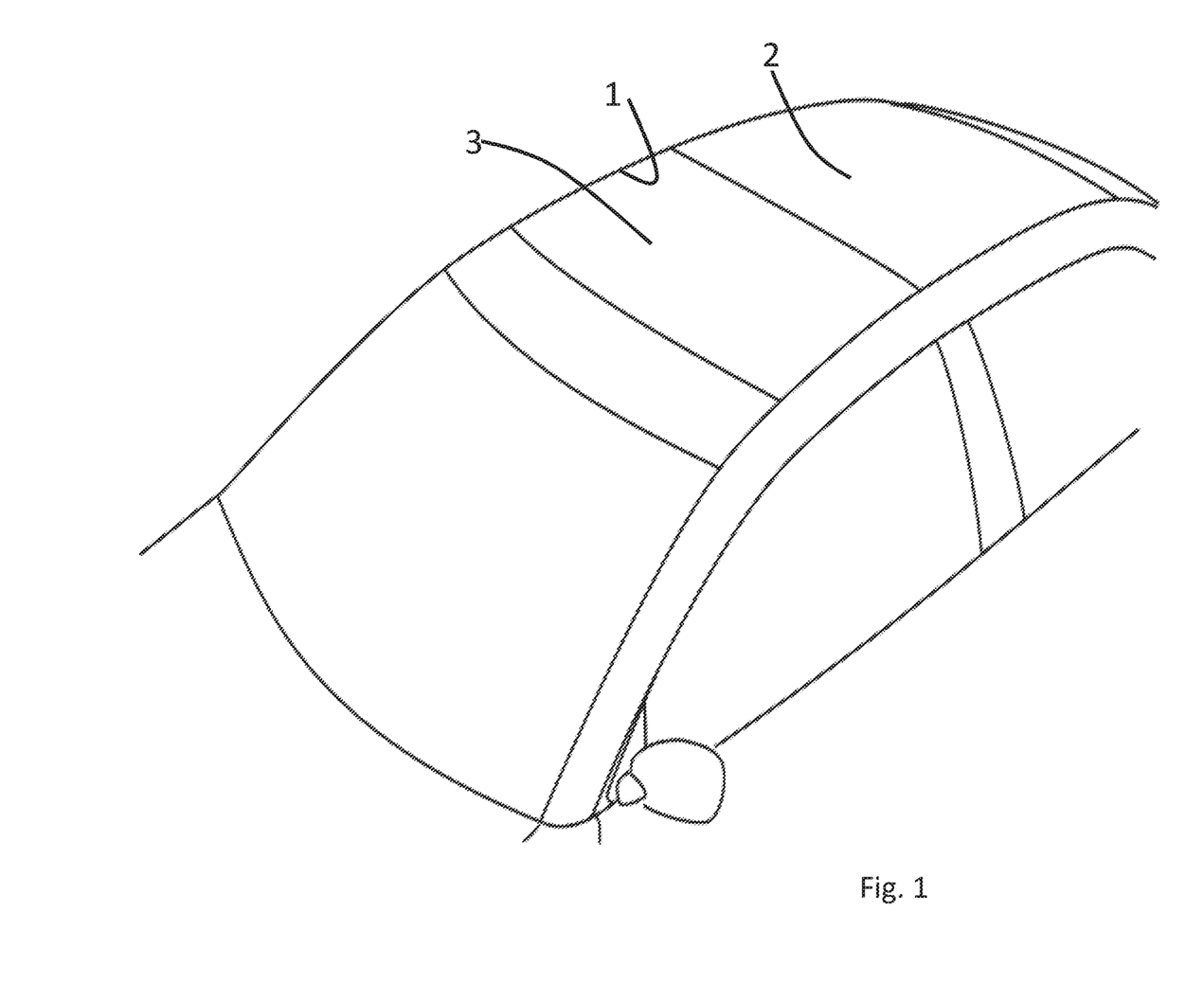
FIG. 1 is a perspective view of a vehicle roof having an open roof construction.
Figure 2:
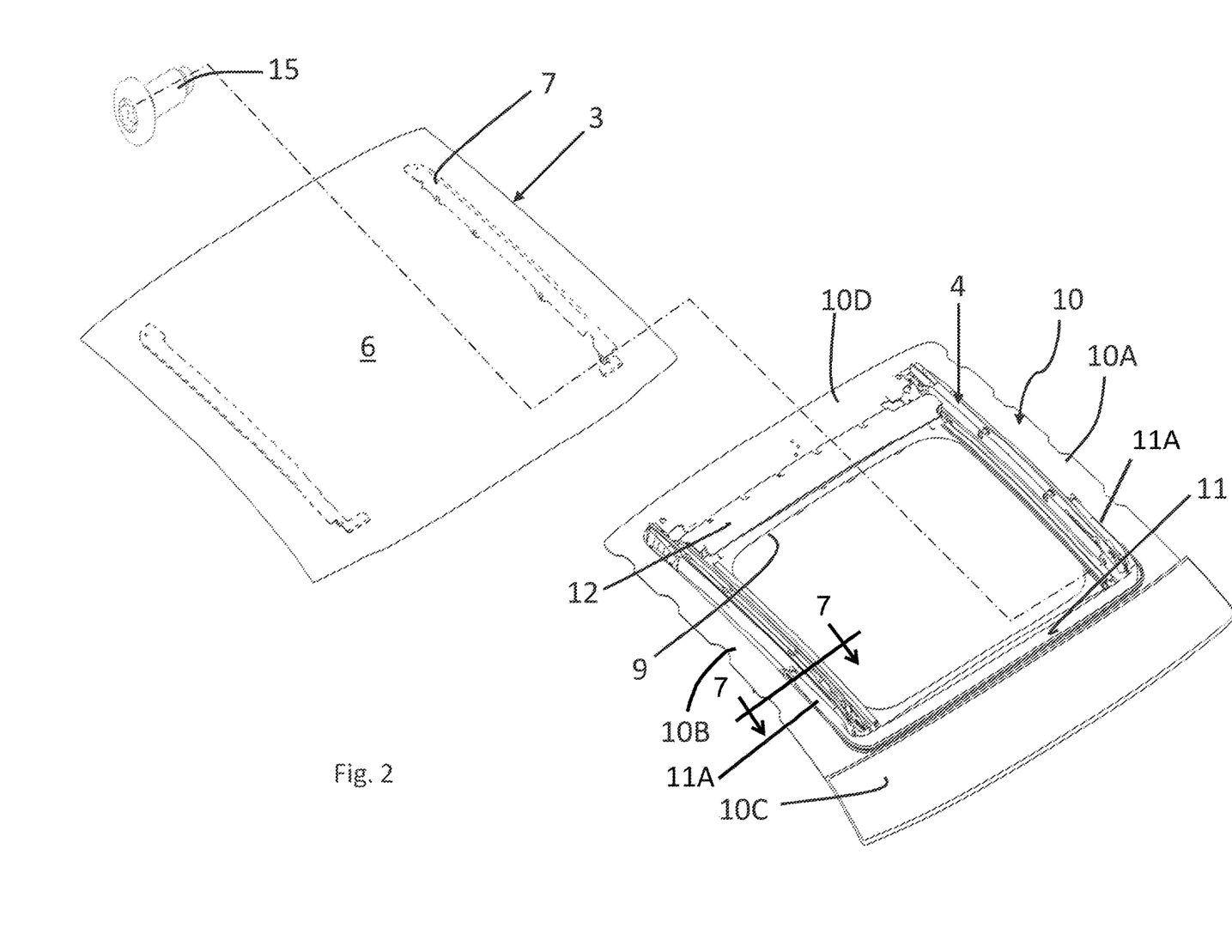
FIG. 2 is an enlarged exploded view of the open roof construction of FIG. 1 with the panel shown separately and a screw on a larger scale.
Figure 3:
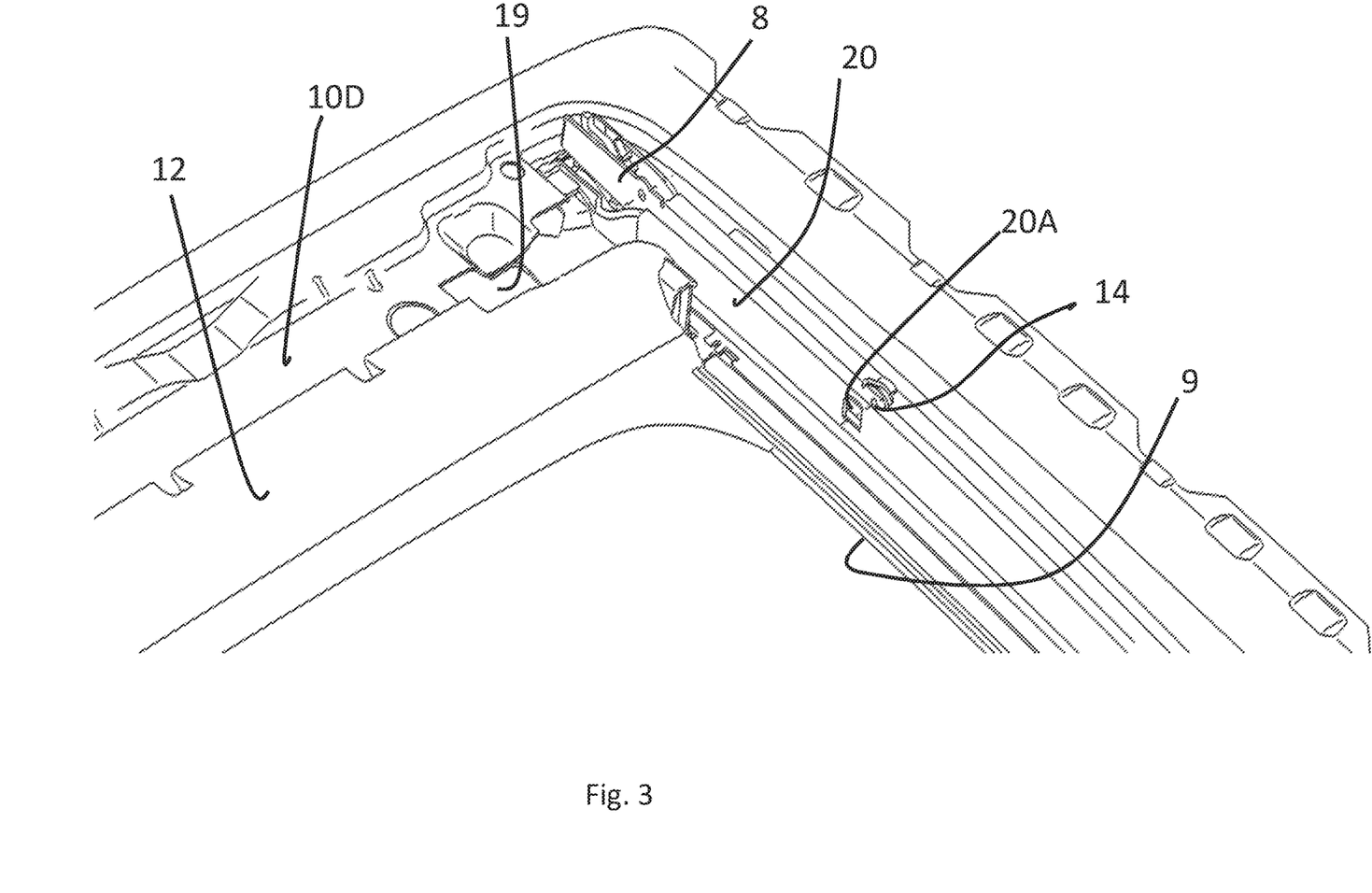
FIG. 3 is an enlarged detail of the rear part of the open roof construction.

Firstly referring to FIGS. 1-3, an example is illustrated of an open roof construction for a vehicle, such as a passenger car. Said open roof construction is for opening and closing at least one roof opening 1 in a fixed roof part 2 of the vehicle and includes at least one movable panel, in particular a rigid, transparent panel 3 which, by an operating mechanism 4 not illustrated in detail but known per se, can be moved for opening and closing said roof opening 1. Commonly, as is known, movable panel 3 is guided in longitudinal guide rails 5 mounted to or formed in stationary roof part 2 along longitudinal sides of roof opening 1. A user operated device such as a motor or crank (not illustrated) is operably coupled to panel 3 via cables or the like to move panel 3 selectively between its open and closed positions. In FIG. 1 closure panel 3 has been illustrated in a position in which it closes roof opening 1. The invention can be used for all types of open roof constructions comprising one or more panels.

The panel 3 comprises a panel main body 6, in particular made of glass or plastic to reduce the weight of panel 3. The panel 3 further comprises a panel bracket 7, which is for example attached to or is part of a reinforcement mounted to the bottom side of panel main body 6. The operating mechanism 4 includes a movable panel support 8 on its upper side to allow attachment of panel bracket 7 and therewith movement of panel 3 between the closed and open positions.

The guide rails 5 for the operating mechanism 4 are provided on both longitudinal sides (i e running in longitudinal direction of the vehicle) of a passage opening 9 in a frame 10 acting as stationary part of the open roof construction and being configured to be attached to fixed roof part 2 of the vehicle. The passage opening 9 is smaller in size than roof opening 1 both at the front and rear of roof opening 1 where a wind deflector 11 and a rollo winding tube 12 of a rollo sunscreen system are arranged, respectively, and at the longitudinal sides where guide rails 5 are mounted on frame 10 at a position bordering passage opening 9, but at least partially below roof opening 1. The guide rails 5 are mounted on side beams 10A, 10B of frame 10, wind deflector 11 on a front beam 10C and rollo winding tube 12 on a rear beam 10D of frame 10.

In order to attach panel brackets 7 to the respective panel supports 8, the panel supports are provided with a number of holes 13 and panel brackets 7 with the same number of threaded holes 14, such that a screw 15 can be inserted into aligned holes 13 and 14 and tightened to clamp panel supports 8 to the respective panel brackets 7. A washer 16 may be used in each screwed connection.

In order to tighten screws 15 use is made during assembly of a screwdriver S which is operated by an operator. To allow easy alignment of a bit of screwdriver S with a screwdriver recess in the head of screws 15, a funnel 18 is arranged for each pair of holes 13, 14. The funnel 18 is aligned with holes 13, 14 at least when panel 3 is in its closed position within roof opening 1. If funnels 18 would be mounted to panel 3, then they would always be aligned with holes 13, 14, but if funnels 18 are mounted to a part of frame 10, they are positioned such that they are only aligned with the corresponding holes 13, 14 when panel 3 is closed. The screws 15 are preferably tightened in the closed position of panel 3, because panel 3 is preferably adjusted to the correct height with respect to fixed roof part 2, i.e. flush with the surrounding fixed roof part, when it is in closed position, so in this way adjustment and following final attachment of panel bracket 7 to panel support 8 can be done in one sequence without having to move panel 3.

In order to attach panel brackets 7 to panel supports 8 over the full length of panel 3, some pairs of holes 13, 14 are situated in a position behind or in front of passage opening 9 in frame 10, which is normally used to bring screwdriver bit at the level of screws 15 from below. If a pair of holes is behind or in front of passage opening 9, as seen in longitudinal direction of the vehicle, this cannot be used to access front and rear screws 15.

Figure 4:
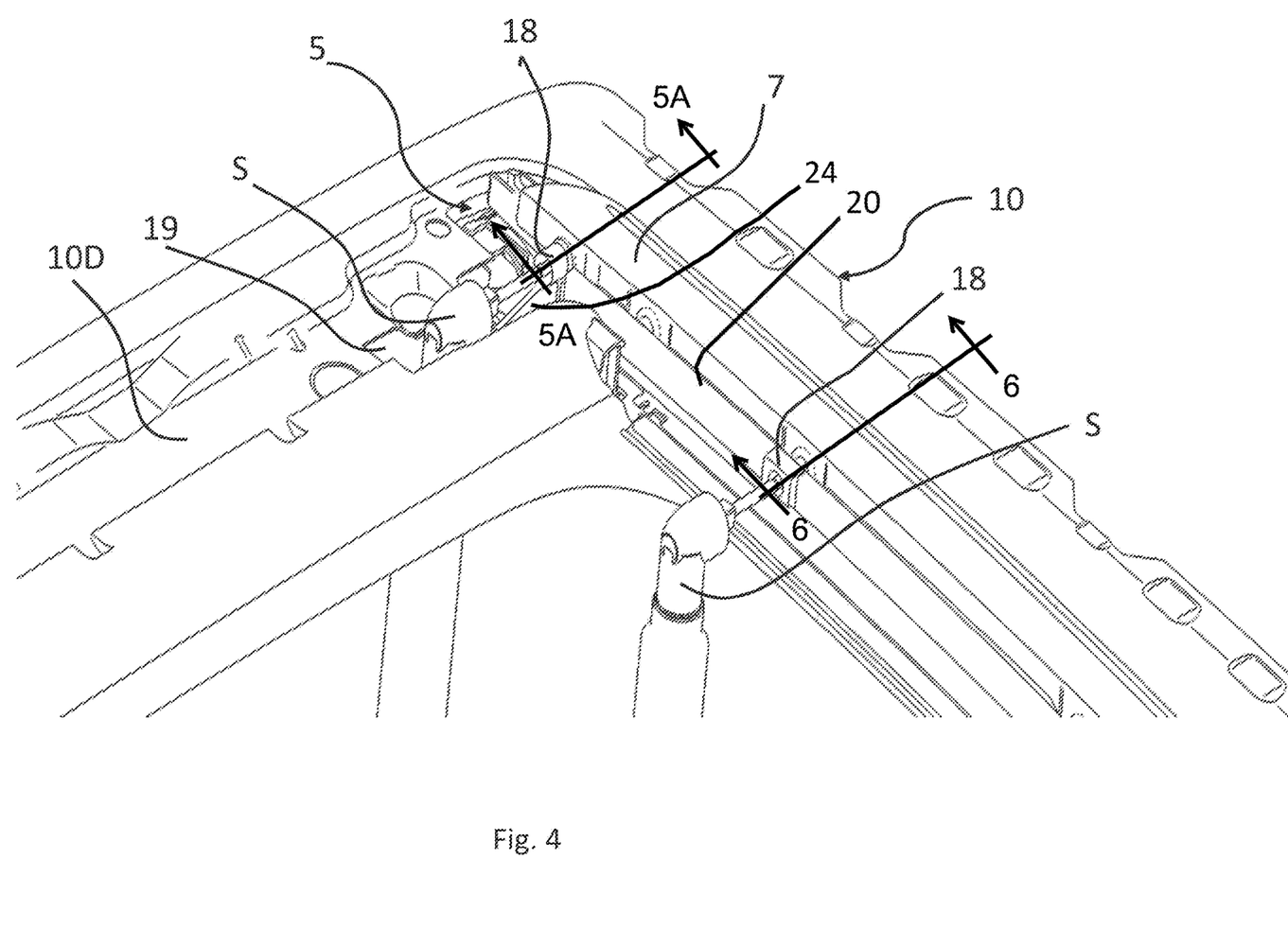
FIG. 4 is a view similar to that of FIG. 3, illustrating how screwdrivers are used to attach the panel to its operating mechanism.

As is shown in FIG. 4 of the drawings, rear cross beam 10D of frame 10 is provided with a mounting opening 19 at a longitudinal position which is in the same transverse plane as the rear pair of holes 13, 14. Mounting opening 19 is also positioned at an appropriate distance from panel support 8 and thus from the head of screw 15 in order to engage screwdriver S with screw 15, and is dimensioned to allow passage of the screwdriver head and bit. The mounting opening 19 extends substantially perpendicularly to holes 13, 14, i.e. within a mainly horizontal plane when frame 10 is in its operational position. It may also be made in an inclined portion of frame 10, but will generally be much bigger than the opening of funnel 18. Normally, mounting opening 19 extends at a lower level than holes 13 and 14 when panel 3 is in its closed position.

Figure 5:
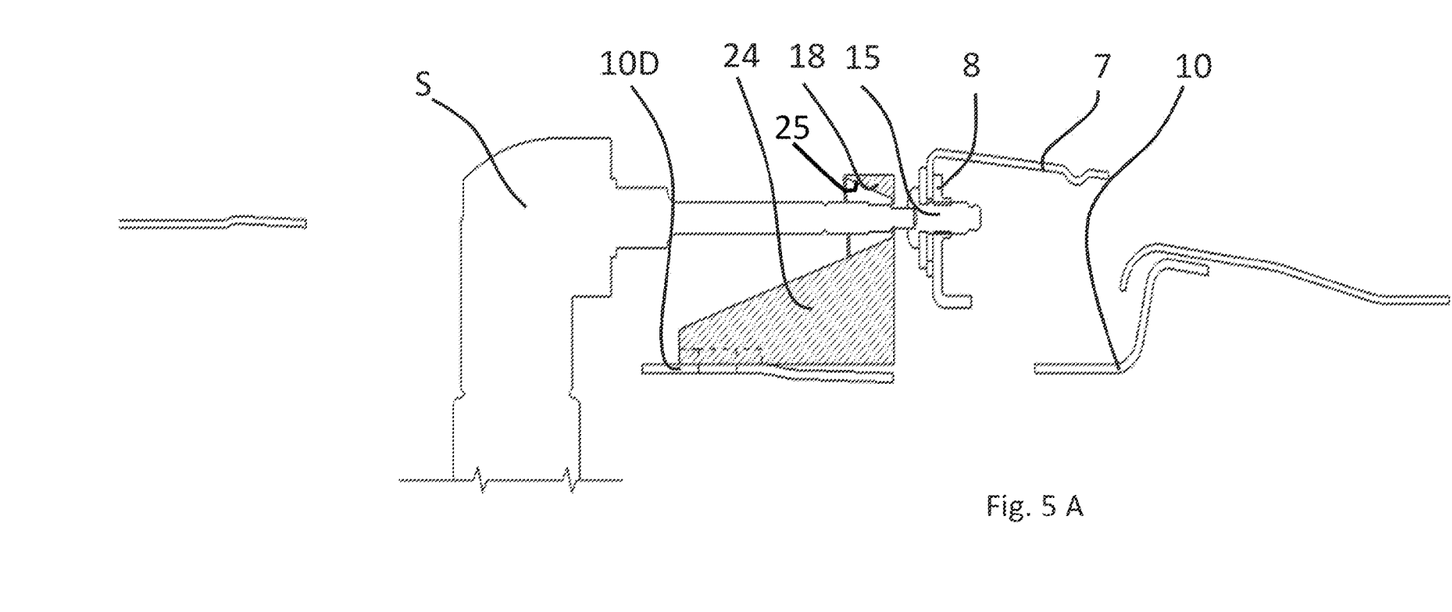
FIG. 5A is a simplified sectional view along the line V-V in FIG. 4 on a larger scale.
FIG. 5B is an enlarged top view of the funnel and its support member of FIG. 5A.

Also shown in FIG. 4 and FIG. 5A, 5B is that funnel 18 for the rear pair of holes 13, 14 is mounted on a support member 24 which is part of or arranged on rear beam 10D such that funnel 18 is aligned with rear pair of holes 13, 14 when panel 3 is in its closed position.

Figure 6:
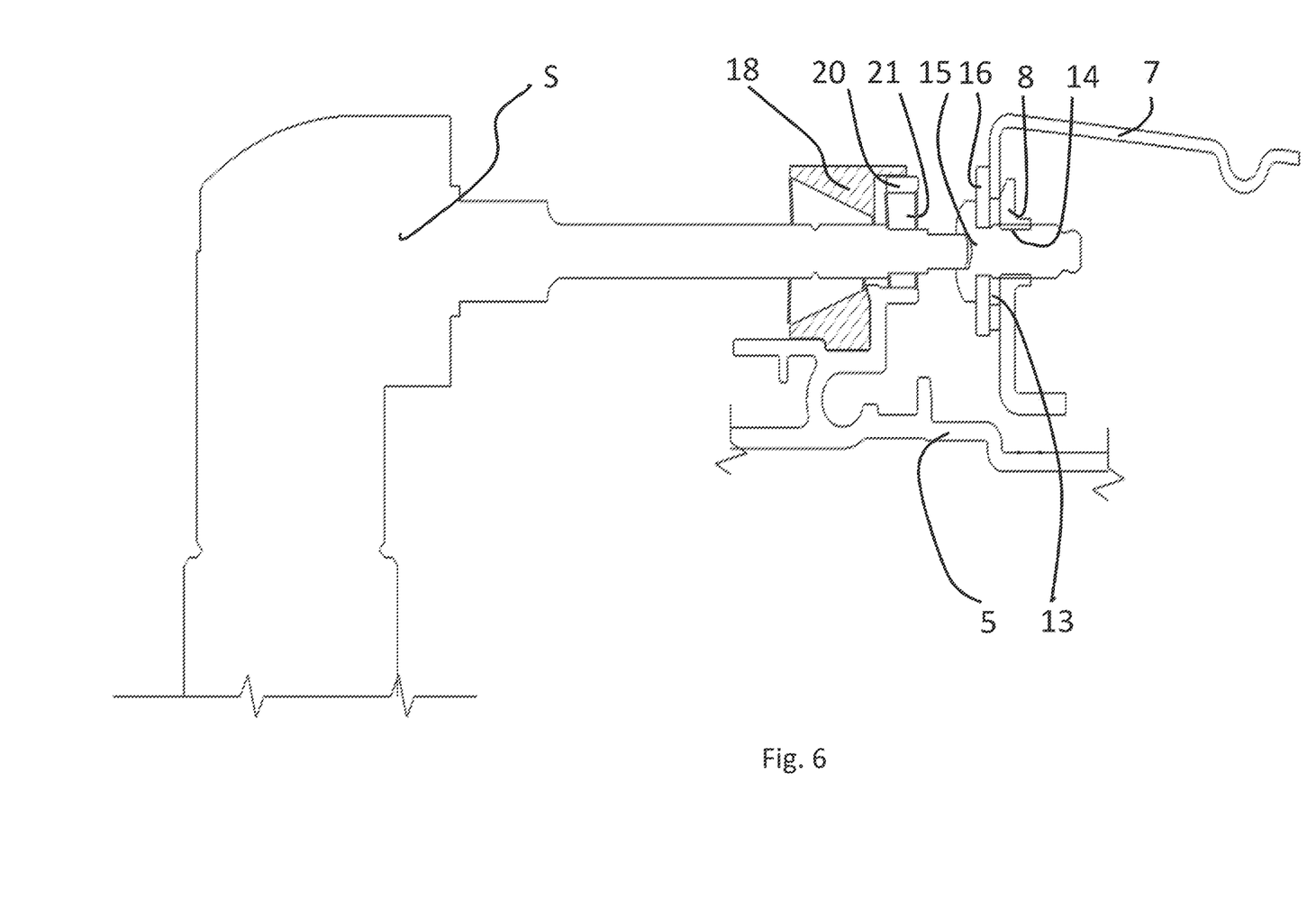
FIGS. 6 and 7 are views similar to that of FIG. 5A, albeit on a larger scale, but showing screw tightening in the middle and front section of the panel.

FIGS. 4 and 6 show that funnels 18 for the central portion of panel 3 are clipped on a flange 20 of guide rail 5. If the level of the upper side of flange 20 is above the opening in funnel 18, flange 20 will have a passage opening 21 for screwdriver 17. The opening 21 could also be used to clip funnel 18 to flange 20.

Figure 7:
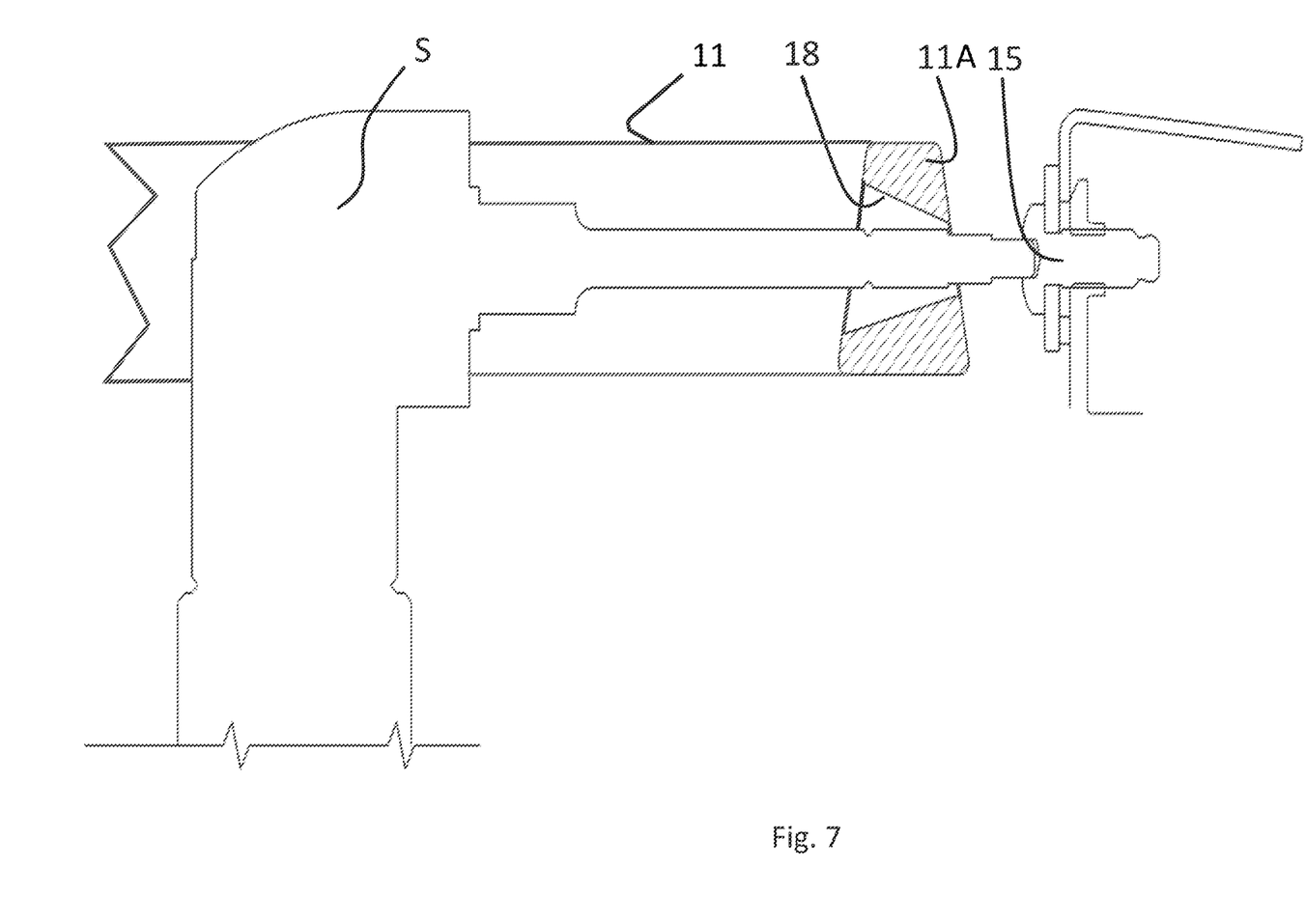

FIG. 7 shows funnel 18 at the front pair of holes 13 and 14. Front beam has a mounting opening (not shown) in front beam 10C and funnel 18 is provided in a side arm 11A of wind deflector 11. Wind deflector 11 will be in a low resting position below fixed roof part 2 when panel 3 is in its closed position.

Figure 8:
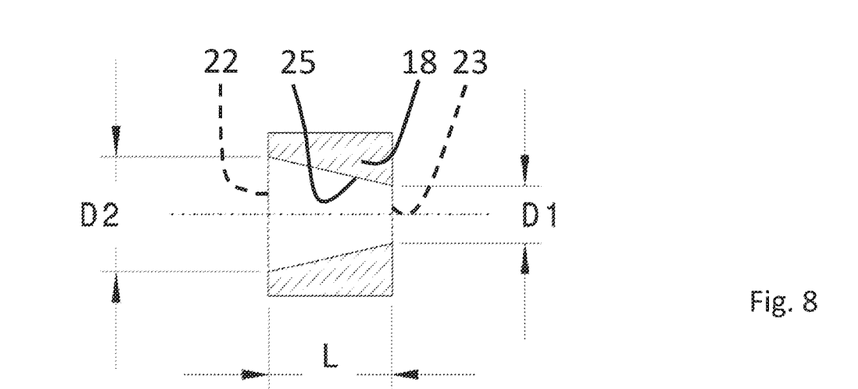
FIG. 8 illustrates the dimensional aspects of the funnel.

FIG. 8 shows a very schematic illustration of a funnel 18. Funnel 18 has an entrance 22 where screwdriver S enters funnel 18 and an exit 23 opposite to holes 13, 14. Exit 23 has a cross section or diameter D1 which is large enough to allow passage of the screwdriver bit and small enough to ensure that the screwdriver bit is brought in engagement with screw 15. Entrance 22 is larger than exit 23 so that funnel 18 is formed where the screwdriver bit is easily caught by entrance 22 and then guided by a narrowing passage 25 through funnel 18 to small exit 23 where the screwdriver bit will be aligned with holes 13, 14 and screw 15. Diameter D2 (or smallest dimension of entrance 22) is preferably 2 times or more larger than exit diameter D1. Diameter D2 will be limited by the available space.

Figure 9:
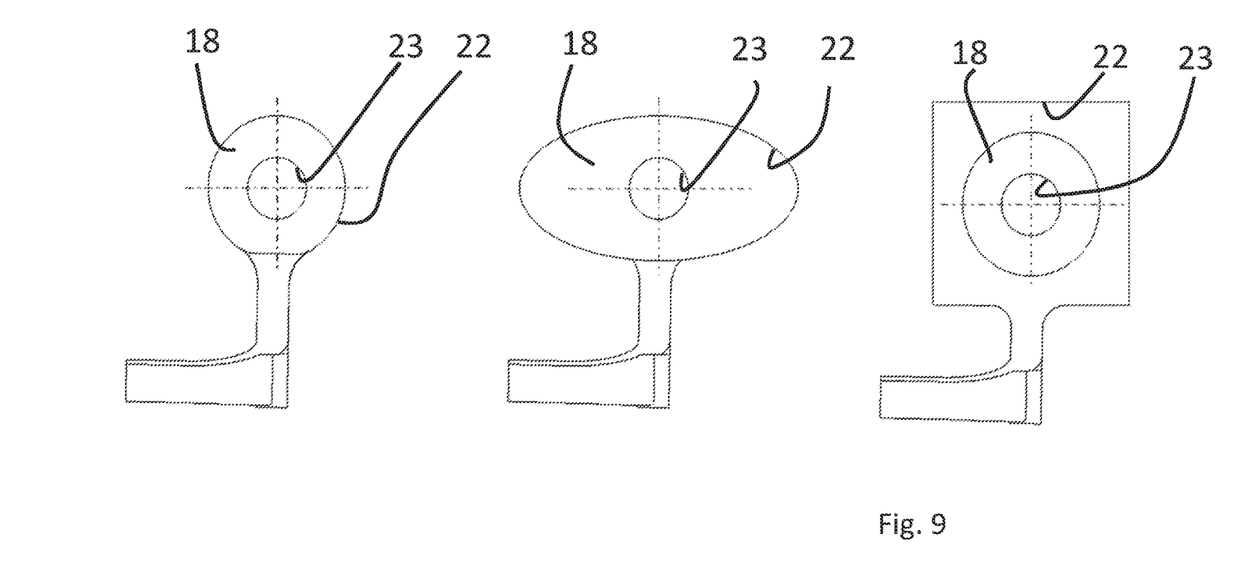
FIG. 9A, 9B, 9C are front views of three embodiments of the funnel.
Figures 9A, 9B:
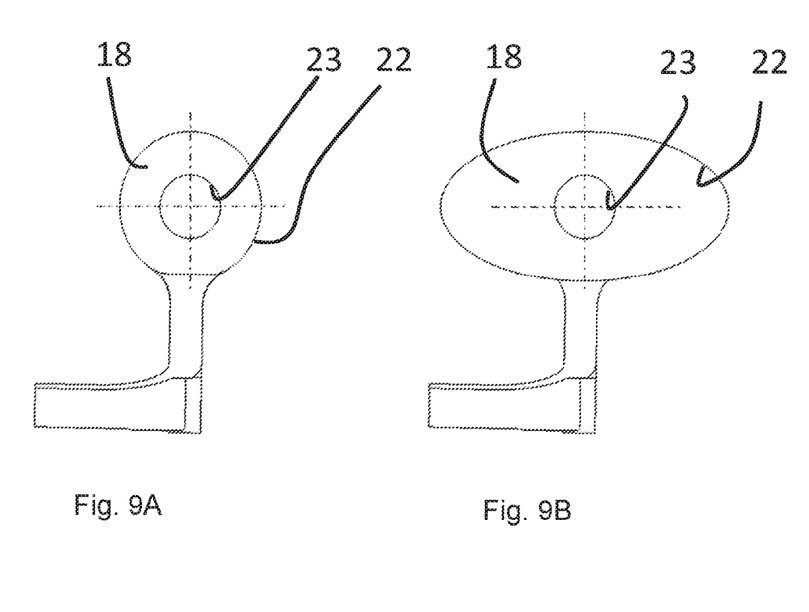
Figure 9C:
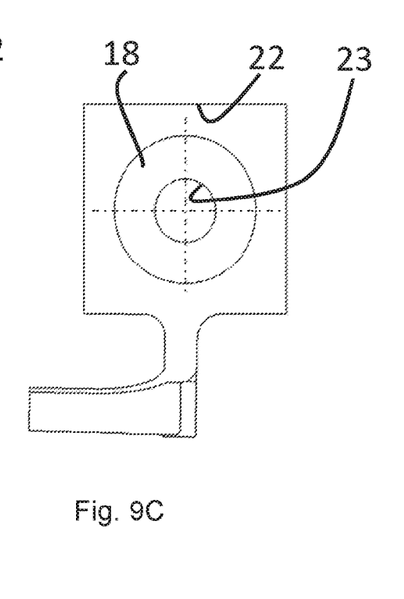

FIGS. 9A, 9B and 9C show three embodiments of funnel 18 of which the entrance has a cross section that is either circular (FIG. 9A) or has a shape diverging from a circle. In FIG. 9B, the entrance 22 has an oval cross section, while entrance 22 of FIG. 9C is rectangular, in particular square. FIGS. 9B and 9C show larger entrances than FIG. 9A, but the height is not or hardly greater.

Figure 10:
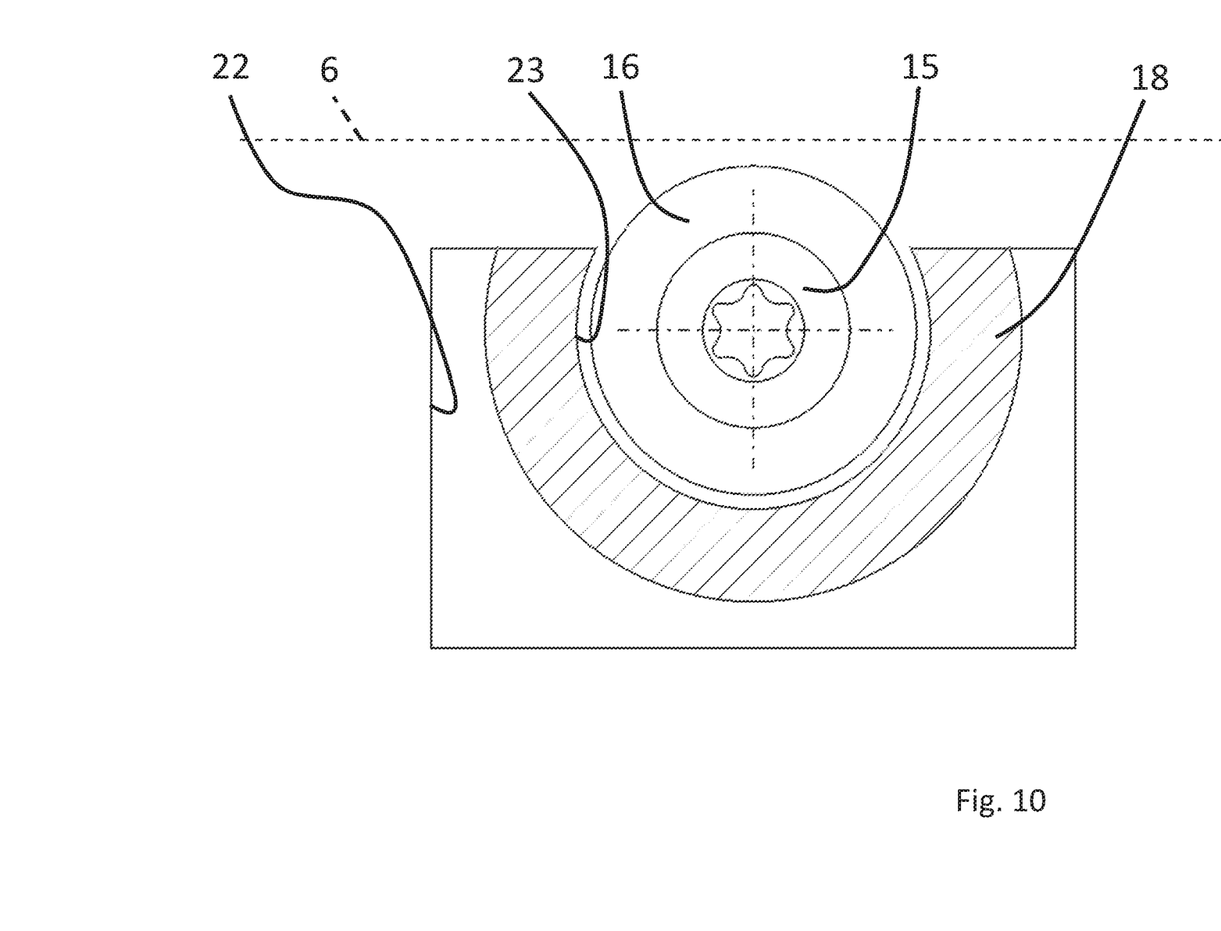
FIG. 10 is an enlarged front view of the funnel, screw and washer.

FIG. 10 shows a funnel 18 which has an open top, at least in the first part of funnel 18 from entrance 22. This reduces the height of funnel 18, while in the closed position of panel 3, the bottom side of panel main body 6 (or a part attached to it) will be close to the top side of funnel 18 so that it will act as a part of funnel 18.

Figure 11:
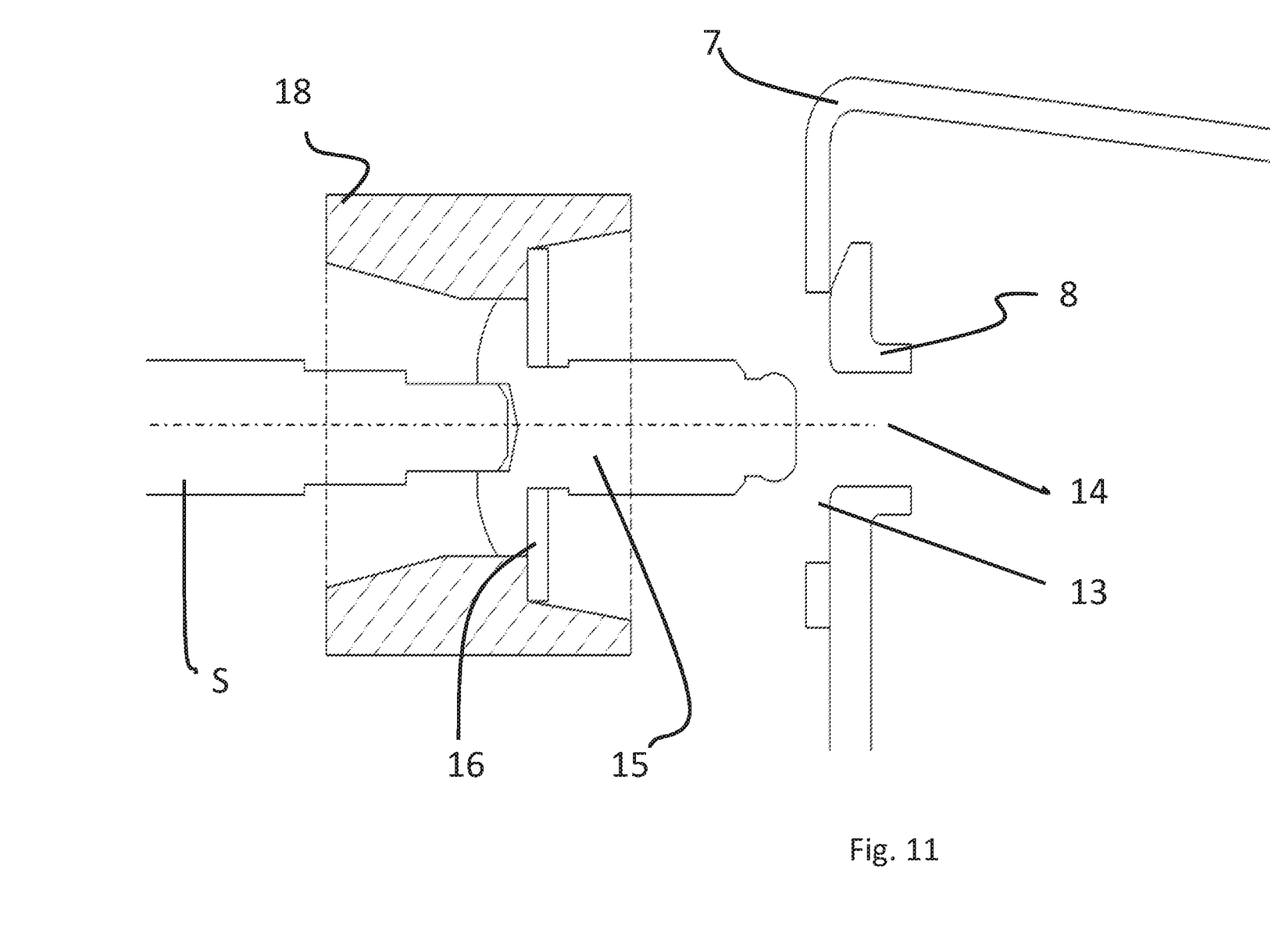
FIG. 11 is a still larger cross-sectional view as in FIG. 7 with the screw and washer pre-mounted in the funnel.

In a last embodiment according to FIG. 11, funnel 18 is configured to accommodate and hold screw 15 and washer 16 in a position to be engaged by screwdriver S and to be pushed out by it so that the screw thread thereof will be inserted through hole 13 in panel bracket 7 and into threaded hole 14 of panel support 8. In this way, it is not necessary to pre-mount screw 15 into holes 13, 14 in an open position of panel 3 before screw 15 is brought into alignment with the respective funnel 18 when panel 3 is moved to its closed position. Of course it is possible to make the passage in funnel 18 smaller at the entrance side of screw 15 to even better guide screwdriver S to screw 15 and provide a limiting wall for the head of screw 15.

As is shown, hole 13 in panel bracket 7 is (much) larger than the shaft of screw 15 so that panel bracket 7 can be adjusted with respect to panel support 8 to obtain a correct position of panel 3 when it is closed.

The invention is not limited to the embodiments described before, which may be varied widely within the scope of the invention as defined by the appending claims. For example, it would be possible to use the funnels also in other positions, for example in front of a screw for adjusting the wind deflector or other parts that are finally fastened with the open roof construction already mounted in the vehicle and difficult to reach or see. The mounting opening in the frame for the screwdriver may be a hole separate from the passage opening, for example if it is made behind the rollo screen winding tube, but it may also connect to the passage opening, for example formed as a bulge or recess to the mainly rectangular passage opening. Generally there will be a mounting opening near each panel support.

The invention claimed is:

1. An open roof construction for a vehicle having a roof opening in a fixed roof, comprising:
    a frame including a passage opening for placement below the roof opening in the fixed roof, the passage opening being smaller than the roof opening;
    a panel for closing the roof opening in a closed position and at least partially opening the roof opening in an open position; and
    an operating mechanism on each side of the passage opening configured to support and move the panel, the panel having a panel bracket below each longitudinal side and the operating mechanisms each include a panel support, the panel bracket and the panel support each being elongated and extending a substantial part of the longitudinal length of the panel and each having a plurality of holes and a screw for each pair of holes to attach the panel bracket to the panel support, wherein at least one pair of holes is provided with a funnel which is in line with this pair of holes at least when the panel is in the closed position in order to guide a screwdriver to the respective screw which is pre-mounted in or in front of the pair of holes.

2. The open roof construction according to claim 1, wherein at least one pair of holes is in a position before or behind the passage opening, as seen in longitudinal direction, when the panel is in the closed position within the roof opening, and wherein the frame is provided with a mounting opening in a longitudinal position which is in the same transverse plane as said at least one pair of holes and which is dimensioned to allow passage of the screwdriver to fasten the screw of said at least one pair of holes.

3. The open roof construction according to claim 1, wherein the at least one funnel is attached to a guide rail for the operating mechanism, which extends along the passage opening in the frame in a longitudinal direction of the vehicle.

4. The open roof construction according to claim 2, wherein the funnel for the screw near the front of the panel is provided in a wind deflector arm which is in a lower rest position when the panel is in the closed position.

5. The open roof construction according to claim 2, wherein the funnel for the screw near the rear of the panel is provided on or is part of a rear beam of the frame.

6. The open roof construction according to claim 1, wherein the funnel has an entrance opening where the screwdriver is inserted and an exit opening opposite the pair of holes, and wherein a cross-section of the entrance opening is at least twice that of the exit opening.

7. The open roof construction according to claim 1, wherein the funnel is configured to accommodate and hold a head of the screw in position in front of the pair of holes.

8. The open roof construction according to claim 7, wherein the funnel is configured to accommodate and hold the head of the screw and a washer associated with the screw.

9. The open roof construction according to claim 6, wherein the exit opening has a circular cross-section and the entrance opening has a cross section different from a circle.

10. The open roof construction of claim 9 wherein the entrance opening has a rectangular cross section.

11. The open roof construction of claim 9 wherein the entrance opening has an oval cross section.

12. The open roof construction according to claim 6, wherein a top of the funnel is open, but is delimited in the closed position of the panel by another part of the open roof construction.

13. The open roof construction of claim 12 wherein said another part is the panel.

14. The open roof construction of claim 12 wherein an inner cross section of the open top funnel is more than 60% of a complete cross section.

15. An open roof construction for a vehicle having a roof opening in its fixed roof, comprising:
   a frame including a passage opening for placement below the roof opening in the fixed roof, the passage opening being smaller than the roof opening;
   a panel for closing the roof opening in a closed position and at least partially opening the roof opening in an open position; and
   an operating mechanism on each side of the passage opening configured to support and move the panel, the panel having a panel bracket below each longitudinal side and the operating mechanisms each include a panel support, the panel bracket and the panel support each being elongated and extending a substantial part of the longitudinal length of the panel and each having a plurality of holes and a screw for each pair of holes to attach the panel bracket to the panel support, wherein the frame is provided with a mounting opening in a longitudinal position which is transversely in line with said at least one pair of holes and which is dimensioned to allow passage of a bit and head of a screwdriver to fasten the screw of said at least one pair of holes.

16. The open roof construction according to claim 15, wherein the mounting opening in the frame is in a plane which is at a lower level than that of holes in the panel bracket and panel support.

17. A method of attaching a panel to an operating mechanism of an open roof construction, comprising:
   providing a frame having a passage opening therein;
   providing an operating mechanism at each longitudinal side of the passage opening, said operating mechanism including a movable panel support;
   providing a panel having on each longitudinal side a panel bracket for attachment to the corresponding panel support by a screw fitting in a corresponding holes in the panel bracket and panel support, respectively, a longitudinal dimension of the panel being larger than that of the passage opening, and at least one of the holes being positioned before or behind the passage opening when the panel is in its closed position;
   providing the frame with a mounting opening transversely in line with the corresponding holes in the panel bracket and support when the panel is in its closed position; and
   moving a screwdriver head and bit through said mounting opening in the frame to bring the bit in line with the screw which is pre-mounted in or in front of the holes and fastening the screw.

18. The method according to claim 17, wherein the screwdriver bit is brought in line with the screw by a funnel mounted in line with the corresponding holes so as to guide the screwdriver to the screw.

19. The method according to claim 17, wherein the screw is pre-mounted in the holes.

20. The method according to claim 18, wherein the screw is pre-mounted in the funnel.

* * * * *